(12) United States Patent
Emelie et al.

(10) Patent No.: US 11,195,480 B2
(45) Date of Patent: Dec. 7, 2021

(54) PARTIAL UPDATE DRIVING METHODS FOR BISTABLE ELECTRO-OPTIC DISPLAYS AND DISPLAY CONTROLLERS USING THE SAME

(71) Applicant: E INK CORPORATION, Billerica, MA (US)

(72) Inventors: Pierre-Yves Emelie, Mountain View, CA (US); Kenneth R. Crounse, Somerville, MA (US); Karl Raymond Amundson, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/805,431

(22) Filed: Nov. 7, 2017

(65) Prior Publication Data

US 2018/0075812 A1 Mar. 15, 2018

Related U.S. Application Data

(62) Division of application No. 14/447,707, filed on Jul. 31, 2014, now abandoned.

(60) Provisional application No. 61/860,936, filed on Aug. 1, 2013, provisional application No. 61/861,137, filed on Aug. 1, 2013, provisional application No. 61/860,466, filed on Jul. 31, 2013.

(51) Int. Cl.
*G09G 3/34* (2006.01)

(52) U.S. Cl.
CPC .......... *G09G 3/344* (2013.01); *G09G 3/3433* (2013.01); *G09G 2300/0473* (2013.01);
(Continued)

(58) Field of Classification Search
None
See application file for complete search history.

(56) References Cited

U.S. PATENT DOCUMENTS 2,172,970 A 9/1939 Ford
2,766,478 A 10/1956 Charles, Jr. et al.
(Continued)

FOREIGN PATENT DOCUMENTS

JP 2010002741 A 1/2010
JP 2010185972 A 8/2010
(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.
(Continued)

*Primary Examiner* — Amr A Awad
*Assistant Examiner* — Donna V Bocar
(74) *Attorney, Agent, or Firm* — Zhen Bao

(57) ABSTRACT

There are provided display controllers and driving methods related to those described in US Published Patent Application No. 2013/0194250. These include (a) a display controller having an update buffer, means for removing from the update buffer pixels not requiring updating, and means to ensure that pixels having certain special states are not removed from the update buffer; (b) a method of driving a bistable display wherein, in a pixel undergoing a white-to-white transition and lying adjacent another pixel undergoing a visible transition, there is applied to the pixel one or more balanced pulse pairs and at least one top-off pulse; (c) a method of driving a bistable display by overlaying a non-rectangular item over a pre-existing image content and then removing the item, where only pixels in the region of the item perform transitions (including self-transitions); and (d) a method of driving a bistable display in which a proportion of background pixels not undergoing an optical change are subjected to a refresh pulse to correct optical state drift.

3 Claims, 13 Drawing Sheets

(52) U.S. Cl.
CPC ..... *G09G 2300/06* (2013.01); *G09G 2310/04* (2013.01); *G09G 2310/08* (2013.01); *G09G 2320/0209* (2013.01); *G09G 2320/0257* (2013.01); *G09G 2320/041* (2013.01); *G09G 2320/045* (2013.01); *G09G 2320/048* (2013.01); *G09G 2340/12* (2013.01); *Y02E 50/10* (2013.01); *Y02E 50/30* (2013.01)

(56) References Cited

U.S. PATENT DOCUMENTS

| | | | |
|---|---|---|---|
| 2,800,457 A | 7/1957 | Barrett et al. | |
| 2,932,629 A | 4/1960 | Wiley | |
| 2,934,530 A | 4/1960 | Ballast et al. | |
| 3,036,388 A | 5/1962 | Tate | |
| 3,229,281 A | 1/1966 | Hackenfort | |
| 3,320,523 A | 5/1967 | Trimble | |
| 3,358,185 A | 12/1967 | Lally | |
| 3,384,488 A | 5/1968 | Tulagin et al. | |
| 3,385,927 A | 5/1968 | Hamann | |
| 3,389,194 A | 6/1968 | Somerville | |
| 3,394,002 A | 7/1968 | Bickmore | |
| 3,406,363 A | 10/1968 | Tate | |
| 3,423,489 A | 1/1969 | Arens et al. | |
| 3,437,502 A | 4/1969 | Werner | |
| 3,460,248 A | 8/1969 | Tate | |
| 3,523,810 A | 8/1970 | Swank | |
| 3,539,465 A | 11/1970 | Hiestand et al. | |
| 3,540,008 A | 11/1970 | Evans et al. | |
| 3,560,956 A | 2/1971 | Sinnott | |
| 3,582,205 A | 6/1971 | Carreira | |
| 4,418,346 A | 11/1983 | Batchelder | |
| 5,760,761 A | 6/1998 | Sheridon | |
| 5,930,026 A | 7/1999 | Jacobson et al. | |
| 5,959,777 A | 9/1999 | Whitehead | |
| 6,055,091 A | 4/2000 | Sheridon et al. | |
| 6,128,124 A | 10/2000 | Silverman | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon et al. | |
| 6,172,798 B1 | 1/2001 | Albert et al. | |
| 6,184,856 B1 | 2/2001 | Gordon, II et al. | |
| 6,225,971 B1 | 5/2001 | Gordon, II et al. | |
| 6,241,921 B1 | 6/2001 | Jacobson et al. | |
| 6,271,823 B1 | 8/2001 | Gordon, II et al. | |
| 6,301,038 B1 | 10/2001 | Fitzmaurice et al. | |
| 6,320,563 B1 | 11/2001 | Yang et al. | |
| 6,445,489 B1 | 9/2002 | Jacobson et al. | |
| 6,504,524 B1 | 1/2003 | Gates et al. | |
| 6,531,997 B1 | 3/2003 | Gates et al. | |
| 6,672,921 B1 | 1/2004 | Liang et al. | |
| 6,753,999 B2 | 6/2004 | Zehner et al. | |
| 6,788,449 B2 | 9/2004 | Liang et al. | |
| 6,825,970 B2 | 11/2004 | Goenaga et al. | |
| 6,842,165 B2 | 1/2005 | Inoue | |
| 6,866,760 B2 | 3/2005 | Paolini Jr. et al. | |
| 6,870,657 B1 | 3/2005 | Fitzmaurice et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,982,178 B2 | 1/2006 | LeCain et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,023,420 B2 | 4/2006 | Comiskey et al. | |
| 7,034,783 B2 | 4/2006 | Gates et al. | |
| 7,075,502 B1 | 7/2006 | Drzaic et al. | |
| 7,116,466 B2 | 10/2006 | Whitesides et al. | |
| 7,119,772 B2 | 10/2006 | Amundson et al. | |
| 7,170,670 B2 | 1/2007 | Webber | |
| 7,193,625 B2 | 3/2007 | Danner et al. | |
| 7,202,847 B2 | 4/2007 | Gates | |
| 7,236,291 B2 | 6/2007 | Kaga et al. | |
| 7,259,744 B2 | 8/2007 | Arango et al. | |
| 7,304,787 B2 | 12/2007 | Whitesides et al. | |
| 7,312,784 B2 | 12/2007 | Baucom et al. | |
| 7,312,794 B2 | 12/2007 | Zehner et al. | |
| 7,321,459 B2 | 1/2008 | Masuda et al. | |
| 7,411,719 B2 | 8/2008 | Paolini, Jr. et al. | |
| 7,420,549 B2 | 9/2008 | Jacobson et al. | |
| 7,453,445 B2 | 11/2008 | Amundson | |
| 7,492,339 B2 | 2/2009 | Amundson | |
| 7,528,822 B2 | 5/2009 | Amundson et al. | |
| 7,545,358 B2 | 6/2009 | Gates et al. | |
| 7,583,251 B2 | 9/2009 | Arango et al. | |
| 7,602,374 B2 | 10/2009 | Zehner et al. | |
| 7,612,760 B2 | 11/2009 | Kawai | |
| 7,679,599 B2 | 3/2010 | Kawai | |
| 7,679,814 B2 | 3/2010 | Paolini, Jr. et al. | |
| 7,688,297 B2 | 3/2010 | Zehner et al. | |
| 7,733,311 B2 | 6/2010 | Amundson et al. | |
| 7,733,335 B2 | 6/2010 | Zehner et al. | |
| 7,839,564 B2 | 11/2010 | Whitesides et al. | |
| 7,952,557 B2 | 5/2011 | Amundson et al. | |
| 7,956,841 B2 | 6/2011 | Albert et al. | |
| 8,009,348 B2 | 8/2011 | Zehner et al. | |
| 8,077,141 B2 | 12/2011 | Duthaler et al. | |
| 8,102,363 B2 | 1/2012 | Hirayama | |
| 8,115,718 B2 | 2/2012 | Chen et al. | |
| 8,125,501 B2 | 2/2012 | Amundson et al. | |
| 8,139,050 B2 | 3/2012 | Jacobson et al. | |
| 8,237,733 B2 | 8/2012 | Rhodes | |
| 8,289,250 B2 | 10/2012 | Zehner et al. | |
| 8,300,006 B2 | 10/2012 | Zhou et al. | |
| 8,305,341 B2 | 11/2012 | Arango et al. | |
| 8,310,440 B2 | 11/2012 | Miyasaka et al. | |
| 8,319,759 B2 | 11/2012 | Jacobson et al. | |
| 8,466,927 B2 | 6/2013 | Barrus et al. | |
| 8,558,783 B2 | 10/2013 | Wilcox et al. | |
| 8,564,530 B2 | 10/2013 | Low et al. | |
| 8,593,396 B2 | 11/2013 | Amundson et al. | |
| 8,884,997 B2 | 11/2014 | Pallakoff | |
| 8,947,346 B2 | 2/2015 | van Veenendaal et al. | |
| 9,349,327 B2 | 5/2016 | Lee et al. | |
| 9,672,766 B2 | 6/2017 | Sjodin | |
| 2003/0102858 A1 | 6/2003 | Jacobson et al. | |
| 2005/0152020 A1* | 7/2005 | Johnson | G09G 3/344 359/296 |
| 2007/0052648 A1* | 3/2007 | Zhou | G09G 3/344 345/94 |
| 2007/0052667 A1 | 3/2007 | Zhou et al. | |
| 2007/0080926 A1* | 4/2007 | Zhou | G09G 3/344 345/107 |
| 2007/0091418 A1 | 4/2007 | Danner et al. | |
| 2007/0126693 A1 | 6/2007 | Johnson et al. | |
| 2007/0176889 A1 | 8/2007 | Zhou et al. | |
| 2008/0024429 A1 | 1/2008 | Zehner | |
| 2008/0024482 A1 | 1/2008 | Gates et al. | |
| 2008/0136774 A1 | 6/2008 | Harris et al. | |
| 2009/0174651 A1 | 7/2009 | Jacobson et al. | |
| 2010/0265561 A1 | 10/2010 | Gates et al. | |
| 2011/0193840 A1 | 8/2011 | Amundson et al. | |
| 2011/0199671 A1 | 8/2011 | Amundson et al. | |
| 2012/0206467 A1 | 8/2012 | Shih et al. | |
| 2012/0262496 A1 | 10/2012 | Swic | |
| 2013/0194250 A1 | 8/2013 | Amundson et al. | |

FOREIGN PATENT DOCUMENTS

| | | |
|---|---|---|
| JP | 2011227147 A | 11/2011 |
| WO | 2007140202 A2 | 12/2007 |

OTHER PUBLICATIONS

Bach, U. et al., "Nanomaterials-Based Electrochromics for Paper-Quality Displays", Adv. Mater, vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

(56) References Cited

OTHER PUBLICATIONS

Kitamura, T. et al., "Electrical toner movement for electronic paper-like display", Asia Display/IDW '01, pp. 1517-1520, Paper HCS1-1 (2001). Jan. 1, 2001.
Yamaguchi, Y. et al., "Toner display using insulative particles charged triboelectrically", Asia Display/IDW '01, pp. 1729-1730, Paper AMD4-4 (2001). Jan. 1, 2001.
Korean Intellectual Property Office; PCT/US2014/049063; International Search Report and Written Opinion; dated Nov. 24, 2014. Nov. 24, 2014.
European Patent Office; EP 14831680.5; Extended European Search Report; dated May 23, 2017. May 23, 2017.

* cited by examiner

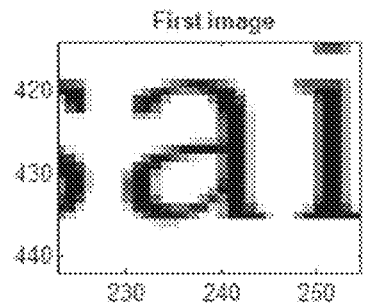 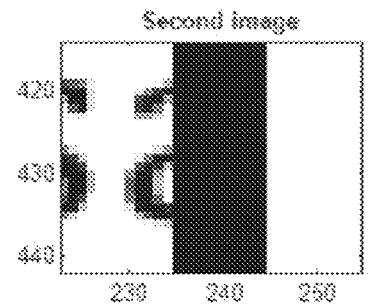 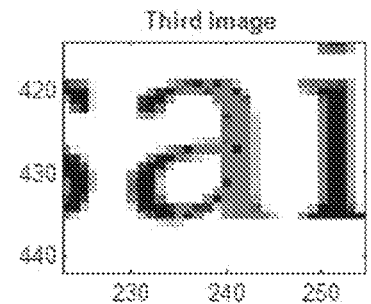
Fig. 9A                Fig. 9B                Fig. 9C
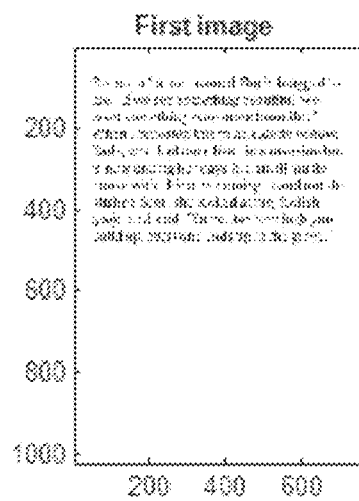 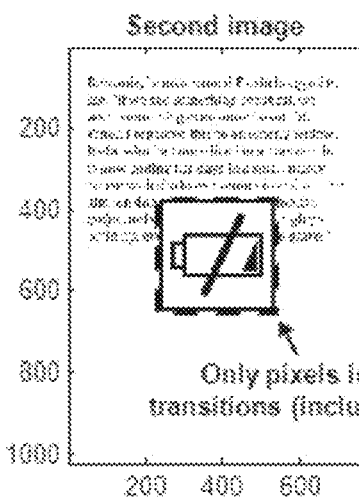 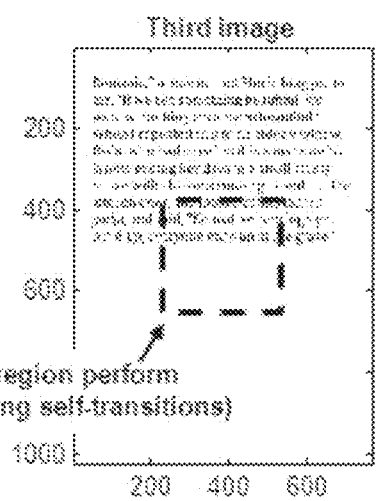
Only pixels in region perform transitions (including self-transitions)
Fig. 10A              Fig. 10B              Fig. 10C

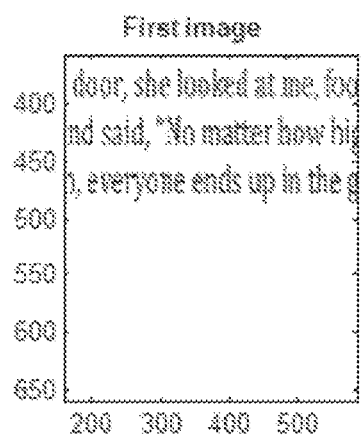 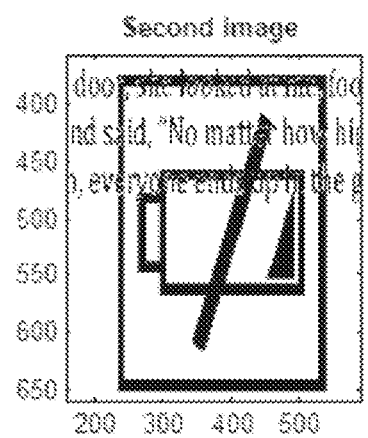 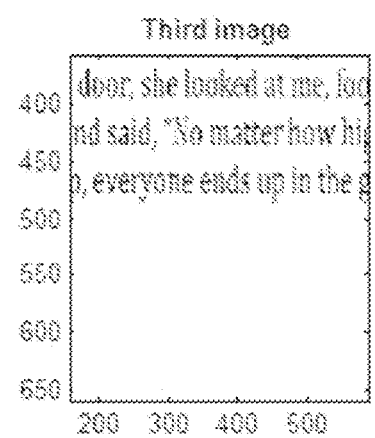
Fig. 11A  Fig. 11B  Fig. 11C
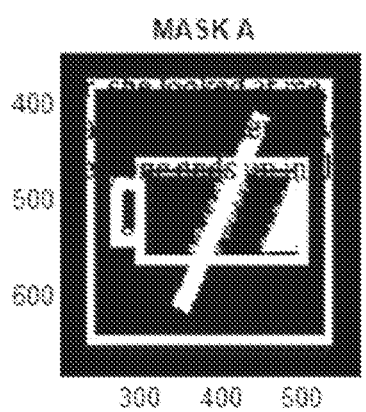 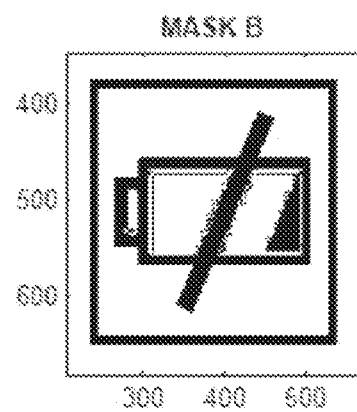 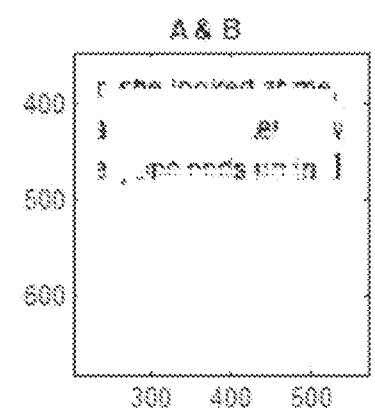
Fig. 12A  Fig. 12B  Fig. 12C

PARTIAL UPDATE DRIVING METHODS FOR BISTABLE ELECTRO-OPTIC DISPLAYS AND DISPLAY CONTROLLERS USING THE SAME

REFERENCE TO RELATED APPLICATIONS

This application is a divisional application of non-provisional application Ser. No. 14/447,707 filed on Jul. 31, 2014, which claimed the benefit of provisional Application Ser. No. 61/861,137, filed Aug. 1, 2013; of provisional Application Ser. No. 61/860,466, filed Jul. 31, 2013; and of provisional Application Ser. No. 61/860,936 filed Aug. 1, 2013.

This application is related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; and 8,077,141; and U.S. Patent Applications Publication Nos. 2003/0102858; 2005/0122284; 2005/0179642; 2005/0253777; 2006/0139308; 2007/0013683; 2007/0091418; 2007/0103427; 2007/0200874; 2008/0024429; 2008/0024482; 2008/0048969; 2008/0129667; 2008/0136774; 2008/0150888; 2008/0291129; 2009/0174651; 2009/0179923; 2009/0195568; 2009/0256799; 2009/0322721; 2010/0045592; 2010/0220121; 2010/0220122; 2010/0265561 2011/0285754, and 2013/0194250. This application is also related to copending Application Ser. No. 14/445,641, filed Jul. 29, 2014 and claiming priority of provisional Application Ser. No.

The aforementioned patents and applications may hereinafter for convenience collectively be referred to as the "MEDEOD" (MEthods for Driving Electro-Optic Displays) applications. The entire contents of these patents and copending applications, and of all other U.S. patents and published and copending applications mentioned below, are herein incorporated by reference.

BACKGROUND OF INVENTION

The present invention relates to methods for driving electro-optic displays, especially bistable electro-optic displays, and to apparatus for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276; and 7,411,719;
(c) Films and sub-assemblies containing electro-optic materials; see for example U.S. Pat. Nos. 6,982,178; and 7,839,564;
(d) Backplanes, adhesive layers and other auxiliary layers and methods used in displays; see for example U.S. Pat. Nos. 7,116,318; and 7,535,624;
(e) Color formation and color adjustment; see for example U.S. Pat. No. 7,075,502; and U.S. Patent Application Publication No. 2007/0109219;
(f) Methods for driving displays; see the aforementioned MEDEOD applications;
(g) Applications of displays; see for example U.S. Pat. No. 7,312,784; and U.S. Patent Application Publication No. 2006/0279527; and
(h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^* = 116(R/R_0)^{1/3} - 16,$$

where R is the reflectance and $R_0$ is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display that the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level (this type of waveform may for convenience be referred to as a "single rail bounce" waveform); in some cases, the transition may be effected by driving from the initial gray level to one extreme optical state, thence to the opposed extreme optical state, and only then to the final extreme optical state (this type of waveform may for convenience be referred to as a "double rail bounce" waveform)—see, for example, the drive scheme illustrated in FIGS. 11A and 11B of the aforementioned U.S. Pat. No. 7,012,600. Present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update drive schemes, where a drive voltage is applied only to pixels that are undergoing a non-zero transition (i.e., a transition in which the initial and final gray levels differ from each other), but no drive voltage is applied during zero transitions (in which the initial and final gray levels are the same). An intermediate form a drive scheme (designated a "global limited" or "GL" drive scheme) is similar to a GC drive scheme except that no drive voltage is applied to a pixel which is undergoing a zero, white-to-white transition. In, for example, a display used as an electronic book reader, displaying black text on a white background, there are numerous white pixels, especially in the margins and between lines of text which remain unchanged from one page of text to the next; hence, not rewriting these white pixels substantially reduces the apparent "flashiness" of the display rewriting. However, certain problems remain in this type of GL drive scheme. Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

Secondly, when an undriven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the undriven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Edge ghosting is clearly visible for example after multiple text page updates followed by an update to a white page where the contour of the previous text will appear darker compared to the background. Hitherto, such edge effects (and the effects of color drift in undriven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals.

The aforementioned US 2013/0194250 describes techniques for reducing flashing and edge ghosting. One such technique, denoted a "selective general update" or "SGU" method, involves driving an electro-optic display having a plurality of pixels using a first drive scheme, in which all pixels are driven at each transition, and a second drive scheme, in which pixels undergoing some transitions are not driven. The first drive scheme is applied to a non-zero minor proportion of the pixels during a first update of the display, while the second drive scheme is applied to the remaining pixels during the first update. During a second update following the first update, the first drive scheme is applied to a different non-zero minor proportion of the pixels, while the second drive scheme is applied to the remaining pixels during the second update. Typically, the SGU method is applied to refreshing the white background surrounding text or an image, so that only a minor proportion of the pixels in the white background undergo updating during any one display update, but all pixels of the background are gradually updated so that drifting of the white background to a gray color is avoided without any need for a flashy update. It will readily be apparent to those skilled in the technology of electro-optic displays that application of the SGU method requires a special waveform (hereinafter referred to as an "F" waveform) for the individual pixels which are to undergo updating on each transition.

The aforementioned US 2013/0194250 also describes a "balanced pulse pair white/white transition drive scheme" or "BPPWWTDS", which involves the application of one or more balanced pulse pairs (a balanced pulse pair or "BPP" being a pair of drive pulses of opposing polarities such that the net impulse of the balanced pulse pair is substantially zero) during white-to-white transitions in pixels which can be identified as likely to give rise to edge artifacts, and are in a spatio-temporal configuration such that the balanced pulse pair(s) will be efficacious in erasing or reducing the edge artifact. Desirably, the pixels to which the BPP is applied are selected such that the BPP is masked by other update activity. Note that application of one or more BPP's does not affect the desirable DC balance of a drive scheme since each BPP inherently has zero net impulse and thus does not alter the DC balance of a drive scheme. A second such technique, denoted "white/white top-off pulse drive scheme" or "WWTOPDS", involves applying a "top-off" pulse during white-to-white transitions in pixels which can be identified as likely to give rise to edge artifacts, and are in a spatio-temporal configuration such that the top-off pulse will be efficacious in erasing or reducing the edge artifact. Application of the BPPWWTDS or WWTOPDS again requires a special waveform (hereinafter referred to as a "T" waveform) for the individual pixels which are to undergo updating on each transition. The T and F waveforms are normally only applied to pixels undergoing white-to-white transitions. In a global limited drive scheme, the white-to-white waveform is empty (i.e., consists of a series of zero voltage pulses) whereas all other waveforms are not empty. Accordingly, when applicable the non-empty T and F waveforms replace the empty white-to-white waveforms in a global limited drive scheme.

It is necessary to distinguish between a partial update drive scheme (in which at least some zero transitions use empty waveforms) and a partial update mode of a drive controller. A partial update mode is a controller function by which, when active, a pixel is removed from the update pipeline if it is a zero transition. For example if the initial state of a pixel was gray level 7 and the final state is also gray level 7, then that pixel will not be assigned to a transition pipeline and will be free to participate in another subsequent update at any time. In a partial update mode, only areas in the next image buffer that differ from the current image buffer will be driven by the drive scheme. This is especially helpful when overlaying an item (such as an icon, cursor or menu over an existing image (typically text); the overlaid can be stamped into the image buffer and sent to the controller, but only the area of the overlaid item will flash.

As already indicated, partial update behavior can also be expressed by drive scheme design. For example, a global limited (GL) mode may have an empty white-to-white transition but non-empty gray-to-gray and black-to-black transitions, so a white background will not flash when overlaying a menu, but the non-white text would flash. Other waveform modes such as DU and GU have all empty zero-transitions. In this case the behavior of the display will be exactly as described for partial update mode, but with one important difference: the zero transition pixels are not removed from the pipeline and must be driven with zeros for the full duration of the update.

One can envision a selective partial update mode in which a zero transition pixel may or may not be removed from the update pipeline (or alternatively, receive a zero transition waveform) depending on an algorithmic decision. This concept may be generalized in the following manner. Each pixel of the display has an associated flag indicating whether that pixel does or does not receive an appropriate waveform. The flags define a Partial Update Mask (PUM) for the whole image in which flags are set TRUE for pixels that are driven and FALSE for pixels which are not driven. Any pixel undergoing a non-zero transition has a TRUE flag, but pixels undergoing zero transitions may have TRUE or FALSE flags.

Some issues arise the aforementioned when the T- and F-transitions are used with partial updates. Firstly, two additional device controller states are required to enable the T- and F-transitions. For simplicity assume states 1-16 correspond to the normal 16 gray levels, while state 17 denotes a T transition and state 18 an F transition. A drive scheme is defined to convert any one initial state into any one final state. In one form of the method, the final image buffer is preprocessed to determine when to substitute state 17 or 18 for state 16 (corresponding to a white gray level)

according to the algorithm being used. The preprocessed image is then sent to the display controller, where partial update logic is applied to remove pixels undergoing zero transitions from the update pipeline. Pixels undergoing 16→16 (normal white-to-white) transitions can be removed from the pipeline since that transition is empty in a GL mode. However, pixels undergoing 17→17 or 18→18 transitions should not be removed from the pipeline since it is possible that the algorithm would need to apply two T or two F transitions successively to the same pixel. One aspect of the present invention provides a means of achieving this aim in both the controller and waveform implementations.

A more difficult issue is that the decisions to use T or F transitions on a pixel is based on the initial and final states of pixels adjacent to the pixel being considered; in particular, in some cases if neighboring pixels are undergoing non-zero transitions, the decision as to whether to use T or F transitions on the pixel being considered can be changed. The use of a partial update mode can thwart the ability of the algorithm to correctly identify neighboring pixels not undergoing non-zero transitions, which can lead to reduced efficacy or even the introduction of new artifacts.

A controller may also make use of a "regional update mode"; this mode is similar to a partial update mode except that only pixels within a selected region of the display are placed on the update pipeline. A regional update mode can be considered to be a specific case of a selective partial update mode in which the Partial Update Mask is set to FALSE for any pixel outside of the selected region. However, regional updates require special handling, as described below, because typically only data for the selected region is transferred to the controller.

A second aspect of the present invention relates to improving performance of displays at temperatures above room temperature, for example when a display in the form of an electronic book reader is being used outdoors in summer. As already mentioned, US 2013/0194250 describes a "balanced pulse pair white/white transition drive scheme" or "BPPWWTDS". In some cases, for example some electrophoretic displays operated at temperatures of 30° C. and above, a BPPWWTDS has been shown to be ineffective in reducing all edge artifacts. FIG. 1 shows that using a BPPWWTDS at 31° C. and 35° C. results in near zero improvement in edge ghosting scores after ten iterations with the use of a BPPWWTDS as compared with use of a drive scheme lacking balanced pulse pairs. While it has been observed that a BPPWWTDS is effective in reducing edge ghosting in the area between adjacent pixels as seen in FIG. 2 (which shows a photomicrograph illustrating edge artifacts observed at 45° C. after ten iterations of driving a block of pixels to black, as illustrated on the left side of FIG. 2, followed by driving the same block of pixels to white, as illustrated on the right side, with use of a BPPWWTDS on the neighboring pixels), the issue is that additional effects occurring at these temperatures result in edge artifacts that a BPPWWTDS is ineffective in reducing. For example, when a pixel is updated from white to black with inactive neighbors, one-pixel-wide edge artifacts are observed in its neighbors in the form of pixel darkening and outer edge formation which can be described as high irreversible blooming and can be explained by lateral coupling. These effects build up with the number of updates and quickly result in significant darkening in neighboring pixels. In display operation modes using a BPPWWTDS, such effects can result in significant decrease in performance. For example, in a low flash mode using a BPPWWTDS aimed at maintaining the background white state lightness level, such effects result in unacceptably high decrease in white state lightness level of over 3 L* after 24 updates at 45° C. as seen in FIG. 3.

The second aspect of the present invention relates to a DC imbalanced drive scheme intended to significantly reduce the aforementioned disadvantages of the BPPWWTDS.

A third aspect of the invention relates to improved selective partial update drive schemes. As mentioned above, electro-optic displays can be driven using partial updates, in which all pixels with any "self-transition" (zero transition) going from one image to the next (meaning that the pixel goes from a specific gray level in one image to the same specific gray level in the subsequent image), are not driven or (which amounts to the same thing) are driven with a waveform having a voltage list of zeros. Partial updates may be performed using a special waveform in which all the self-transitions are empty, i.e. filled with zeros, (usually called a "local" waveform) or using a device command that automatically detects self-transitions (known as a "partial update mode").

Partial updates offer benefits in terms of reduced display flashiness. For example, with an initial image that has some text, a partial update may be used if we want to overlay a menu option on top of the text in order to avoid seeing the text updating on to itself. However, partial updates can create problems and/or be undesirable and incompatible with certain drive schemes. For example, consider a menu overlying existing text that is displayed and then dismissed as illustrated in FIGS. 9A-9C. If a partial update drive scheme is used, in text that overlaps with the border of the menu (as shown in FIG. 9B), all pixels with self-transition will be driven with an empty waveform, while their neighbors may be performing transitions with a non-zero waveform, e.g. a voltage list effecting a white-to-black switch from the first image to the second, followed by a black-to-white switch from the second image (FIG. 9B) to the third (FIG. 9C). These neighboring pixels may bloom over the undriven self-transition pixels, resulting in visually apparent text thinning or text fading, as illustrated in the third image.

As described in some of the aforementioned MEDEOD applications, electro-optic displays may also be driven using regional updates, in which only pixels within a selected region of the display (this region may be rectangular or of an arbitrary shape, including being selected pixel by pixel) are driven.

The third aspect of the present invention relates to driving electro-optic displays using selective partial update drive schemes which permit retention of the benefits of partial update drive schemes in terms of reduced flashiness without creating text thinning/fading and with full compatibility with novel display modes for optimal display performance.

A fourth aspect of the present invention relates to drift compensation, that is to say compensating for changes in the optical state of an electro-optic display with time. As already noted, electrophoretic and similar electro-optic displays are bistable. However, the bistability of such displays is not unlimited in practice, a phenomenon known as image drift occurs, whereby pixels in or near extreme optical states tend to revert very slowly to intermediate gray levels; for example, black pixels gradually become dark gray and white pixels gradually become light gray. The white state drift is of particular interest because many electro-optic displays are most commonly used to display images with a white background; for example, electronic book readers normally mimic printed books by displaying black text on a white background. If an electro-optic display is updated using a global limited drive scheme for a long periods of time without a full display refresh, the white state drift becomes an essential part of the overall visual appearance of the display. Over time, the display will show areas of the display where the white state has been recently rewritten and other areas such as the background where the white state has not recently been rewritten and has thus been drifting for some time. This results an optical artifact known as ghosting, whereby the display shows traces of previous images. Such ghosting effects are sufficiently annoying to most users that their presence a significant part in preventing the use of global limited drive schemes exclusively for long periods of time.

FIG. 13 shows an example of how the background white state of a display may drift over the course of about twenty minutes, resulting in significant ghosting as illustrated in FIG. 14, which shows an image after turning 45 text pages in low flash mode with 30 seconds between page turns. In the last image as illustrated in FIG. 14, the text page has just been updated to a white page, and shows the ghosting resulting from "new" white in the text area versus "old" white in the background.

The fourth aspect of the present invention relates to a method for driving a display which reduces or eliminates the problems caused by drift without producing the flash which would be perceived if all background pixels were updated simultaneously as in a global complete drive scheme.

SUMMARY OF INVENTION

The first aspect of the present invention (which may hereinafter be referred to as the "Update Buffer Invention") provides a display controller (capable of controlling the operation of a bistable electro-optic display) having an update buffer, means for removing from the update buffer pixels which do not require updating during a given transition, means for receiving a list of states that should not be removed from the update buffer, and means to ensure that pixels having listed states are not removed from the update buffer.

The first aspect of the present invention also provides a display controller capable of controlling the operation of a bistable electro-optic display and having an update buffer, and means for removing from the update buffer pixels which do not require updating during a given transition, the controller having at least one special transition having two states associated therewith, means to determine when a pixel is undergoing a special transition immediately after a previous special transition, and means to insert into the update buffer the second state associated with the at least one special transition when a pixel is undergoing a special transition immediately after a previous special transition.

The first aspect of the present invention also provides a drive scheme which achieves essentially the same result as the display controllers of the present invention already mentioned. In such a drive scheme, zero transitions use empty waveform, but zero transitions corresponding to the special states use non-empty waveforms. This approach can work well for limited cases such as turning text pages, or going through an image sequence in which each successive image is always different from the previous one, or displaying and dismissing single items (icons, menus, etc.) that do not overlap with any of the non-white content of the initial image, or browsing up and down through an existing menu.

The first aspect of the present invention also provides a modified algorithm for carrying out the SGU, BPPWWTDS or WWTOPDS drive schemes discussed above to take into account the non-flashing pixels that will be introduced by the partial update mode of the controller. First, the Partial Update Mask (PUM) value for each pixel must be computed according to the known controller algorithm. In the simplest case (standard partial update) the PUM is set to False if and only if the initial and final gray levels in the image buffer are the same. Second, a modified algorithm is used which utilizes the PUM to determine local activity as prescribed by the algorithm.

A second aspect of the present invention (which may hereinafter be referred to as the "BPPTOPWWTDS Invention") in effect combines the aforementioned BPPWWTDS and WWTOPDS by applying to pixels undergoing white-to-white transitions, identified as likely to give rise to edge artifacts, and in a spatio-temporal configuration such that the drive scheme of the present invention will be efficacious in erasing or reducing the edge artifact, a waveform which comprises at least one balanced pulse pair and at least one top-off pulse. This drive scheme of the present invention may for convenience be referred to a "balanced pulse pair/top-off pulse white/white transition drive scheme" or "BPPTOPWWTDS".

The BPPTOPWWTDS of the present invention may be applied only when a display is operating in a particular temperature range, for example 30° C. or higher, where a prior art BPPWWTDS is ineffective. The BPPTOPWWTDS waveform for white-to-white transitions may comprise a variable number of balanced pulse pairs at varying locations within the waveform and a variable number of top-off pulses which may vary in location within the waveform relative to the balanced pulse pairs. A single top-off pulse typically corresponds to one frame of white-going drive pulse. The top-off pulse(s) may be located before, after or between the balanced pulse pairs. It is generally preferred that there be only a single top-of pulse in the white-to-white transition waveform.

A third aspect of the present invention (which may hereinafter be referred to as the "Overlay Invention") is intended to be applied when overlaying an item (an icon, menu, etc.) (typically a non-rectangular item) over existing text or image content followed by a removal of the item as generally illustrated in FIGS. 10A-10C. The overlay method of the present invention differs from standard partial updates drive schemes in that only the pixels in the region of the item perform transitions (including self-transitions) in order to avoid text thinning/fading for text that overlaps with the item and to avoid seeing the text outside that area flashing on to itself. One solution is to perform a regional update in the area of the item. Knowing the item geometry and location on the image, the controller can be used to perform a regional update for this area only.

This simple overlay method of the present invention is not well adapted to cover situations in which the overlaid item is not completely opaque, i.e. the item does not fully fill a rectangle, or other area lying within the boundary of the overlaid item. If there are areas intended to be transparent within the overlaid item, they will also be fully updated by the regional drive scheme, which is not desirable for the reasons discussed above. An example of such a scenario is illustrated in FIGS. 11A-11C.

To cope with this type of overlaid item, a preferred method of the present invention updates only the pixels that overlap with the non-transparent (black as illustrated in FIGS. 11A-11C) portions of the overlaid item (including such pixels undergoing self transitions), to produce the second and third images, thus reducing or eliminating visible text thinning/fading. All the pixels with self transitions that do not overlap with the non-transparent (black) portion of the overlaid item are updated with empty self transitions in order to reduce flashiness and avoid most of the text updating on to itself. This means that some black→black transitions are empty (for pixels not overlapping with the non-transparent portions of the overlaid item) and some are non-empty (for all other pixels) when updating to the second (FIG. 11B) and third (FIG. 11C) images.

In some methods of the present invention, it may be advantageous to take advantage of a drive scheme having waveforms for a number of gray levels greater than are actually present on the display. For example, if the display uses only different gray levels, the drive scheme may be a five-bit (32 gray level) drive scheme which takes advantage of the extra "empty" space inside the drive scheme to cope with the differing black-to-black transitions discussed above. A five-bit drive scheme allows 32 states, so that each of the 16 gray levels can use two different states. For example, assuming states 1→32, gray level black can use state 1 which is set with a non-empty self transition (1→1) as well as state 2 which is set with an empty self transition (2→2). Transition 1→2 is empty and transition 2→1 is a full non-empty black→black transition. From the overlaid item, the drive scheme algorithm determines the mask of pixels that must perform non-empty self-transitions as illustrated in FIGS. 12A-12C. In FIG. 12A black denotes the pixels performing self transitions from FIG. 11A to FIG. 11B, while in FIG. 12B black denotes all pixels that are underneath the overlaid item, i.e., all pixels that in non-transparent portions of the overlaid item. ANDing (in the Boolean sense of that term) the masks of FIGS. 12A and 12B produces the mask of FIG. 12C, in which black denotes all pixels performing self transitions that need to be updated with a non-empty waveform. Using the mask of FIG. 12C, gray level black pixels in the second image are processed so that all the black pixels in FIG. 12C stay in state 1, while all other black pixels become state 2. This mask-based algorithm allows all 16 gray levels to perform empty self transitions in some areas and non-empty self transitions in other areas, thus in effect moving back and forth at the pixel level between a partial update mode and a full update mode.

As discussed above and in the aforementioned MEDEOD applications, a particular drive scheme may be used in only certain regions of the display, which may be rectangular or of arbitrary shape. The present invention thus extends to a driving method and controller in which a BPPTOPWWTDS is used in only one of a plurality of regions of a display.

A fourth aspect of the invention (which may hereinafter be referred to as the "Drift Compensation Invention") provides a method of driving a bistable electro-optic display having a plurality of pixels each capable of displaying two extreme optical states, the method comprising:
  writing a first image on the display;
  writing a second image on the display using a drive scheme in which a plurality of background pixels which are in the same extreme optical state in both the first and second images are not driven;
  leaving the display undriven for a period of time, thereby permitting the background pixels to assume an optical state different from their extreme optical state;
  after said period of time, applying to a first non-zero proportion of the background pixels a refresh pulse which substantially restores the pixels to which it is applied to their extreme optical state, said refresh pulse not being applied to the background pixels other than said first non-zero proportion thereof; and
  thereafter, applying to a second non-zero minor proportion of the background pixels different from the first non-zero proportion a refresh pulse which substantially restores the pixels to which it is applied to their extreme optical state, said refresh pulse not being applied to the background pixels other than said second non-zero proportion thereof.

In a preferred form of this drift compensation method, the display is provided with a timer which establishes a minimum time interval (for example, at least about 10 seconds, and typically at least about 60 seconds) between successive applications of the refresh pulses to differing non-zero proportions of the background pixels. As already indicated, the drift compensation method will typically be applied to background pixels in the white extreme optical state but we do not exclude its application to background pixels in the black extreme optical state, or in both extreme optical states. The drift compensation method may of course be applied to both monochrome and gray scale displays.

The present invention also provides novel display controllers arranged to carry out all the methods of the present invention.

In the methods of the present invention, the display may make use of any of the type of electro-optic media discussed above. Thus, for example, the electro-optic display may comprise a rotating bichromal member, electrochromic or electro-wetting material. Alternatively, the electro-optic display may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

The displays of the present invention may be used in any application in which prior art electro-optic displays have been used. Thus, for example, the present displays may be used in electronic book readers, portable computers, tablet computers, cellular telephones, smart cards, signs, watches, shelf labels, variable transmission windows and flash drives.

BRIEF DESCRIPTION OF THE DRAWINGS

As already mentioned, FIG. 1 of the accompanying drawings illustrates the effectiveness of a prior art BPPWWTDS at various temperatures.

As already mentioned, FIG. 9A shows a portion of a text image on a display.

FIG. 9B illustrates the effect of overlaying a menu over the text image of FIG. 9A.

FIG. 9C illustrates the image resulting from subsequent removal of the menu shown in FIG. 9B.

FIG. 10A shows a text image on a display.

FIG. 10B illustrates the effect of overlaying an icon over the text image of FIG. 10A.

FIG. 10C illustrates the image resulting from subsequent removal of the icon shown in FIG. 10B.

FIGS. 11A-11C are enlarged versions of portions of FIGS. 10A-10C respectively illustrating the areas surrounding the icon.

FIGS. 12A-12C show masks used in applying the overlay method of the present invention to the transitions shown in FIGS. 11A-11C respectively.

DETAILED DESCRIPTION

Figure 1:
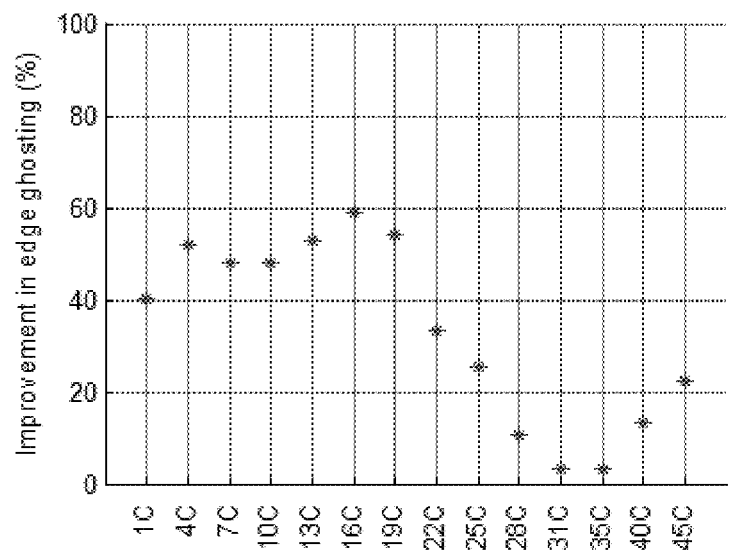

As will be apparent from the foregoing, the present invention provides a number of improvements in the driving of electro-optic displays, especially bistable electro-optic displays, and most especially electrophoretic displays, and in displays and components thereof arranged to carry out the improved method. The various improvements provided by the present invention will primarily be described separately below but it should be noted that a single physical display or component thereof may implement more than one of the improvements provided by the present invention. For example, it will readily be apparent to those skilled in the technology of electro-optic displays that the drift compensation method of the present invention may be implemented in the same physical display as any of the other methods of the present invention.

Part A: Update Buffer Invention

As already mentioned, the update buffer aspect of the present invention provides display controllers and methods for operating a display with the T and F transitions already discussed. In one aspect, this aspect provides a display controller having an update buffer, means for removing from the update buffer pixels which do not require updating during a given transition, means for receiving a list of states that should not be removed from the update buffer, and means to ensure that pixels having listed states are not removed from the update buffer. For example, consider the example given earlier of a controller in which states 1-16 correspond to the normal 16 gray levels, while state 17 denotes a T transition and state 18 an F transition. In this case, the numbers 17 and 18 are sent to the controller. If the controller algorithm recognizes a zero transition where the initial and final states are equal but on the list, the relevant pixel is not removed from the update buffer.

Another aspect of the update buffer invention provides a display controller having an update buffer, and means for removing from the update buffer pixels which do not require updating during a given transition, the controller having at least one special transition having two states associated therewith, means to determine when a pixel is undergoing a special transition immediately after a previous special transition, and means to insert into the update buffer the second state associated with the at least one special transition when a pixel is undergoing a special transition immediately after a previous special transition. For example, consider a modification of the controller discussed in the preceding paragraph in which states 1-16 correspond to the normal 16 gray levels, while states 17 and 19 denote a T transition and state 18 and 20 an F transition. The controller then operates such that if, at any specific pixel, the previous transition was a T-transition, and the next transition is also a T-transition, then the state substituted into the image should be the second state associated with the T transition, namely 19. Thus, the pixel was assigned state 17 for the previous transition but is assigned state 19 for the next transition. In this way the controller will always see special transitions as a change in state the associated pixels will never be flagged and removed from the update pipeline.

As already noted, the update buffer invention also provides a modified algorithm for carrying out the SGU, BPPWWTDS or WWTOPDS drive schemes discussed above to take into account the non-flashing pixels that will be introduced by the partial update mode of the controller. First, the Partial Update Mask (PUM) value for each pixel must be computed according to the known controller algorithm. In the simplest case (standard partial update) the PUM is set to False if and only if the initial and final gray levels in the image buffer are the same. Second, a modified algorithm is used which utilizes the PUM to determine local activity as prescribed by the algorithm. Pseudo-code for two such algorithms is provided below:

---

First algorithm

Inputs: Initial (initial image pixels), Final (final image pixels),
SFT (activity threshold), PUM (pixel update map)
For all pixels in any order:
If the pixel Initial to Final transition is not white-to-white,
apply the standard GL transition.

First algorithm

Else, If at least SFT cardinal neighbors (i.e., neighbors sharing a common edge) are not (making an Initial to Final transition from white-to-white OR have PUM = 0), apply the F transition.
Else, If all four cardinal neighbors have (a Final gray level of white OR have PUM = 0), AND at least one cardinal neighbor has (an Initial gray level not white AND PUM = 1), apply the T transition.
Otherwise use the empty (GL) W -> W transition.
End

Second algorithm

Inputs: Initial (initial image pixels), Final (final image pixels), AM (active mask) SFT (activity threshold), PUM (pixel update map)
For all pixels in any order:
If the pixel Initial to Final transition is not white-to-white, apply the standard GL transition.
Else, If the pixel is selected by the AM, apply the F transition.
Else, If at least SFT cardinal neighbors (i.e., neighbors sharing a common edge) are not (making an Initial to Final transition from white-to-white OR have PUM = 0), apply the F transition.
Else, If all four cardinal neighbors have (a Final gray level of white OR PUM = 0), AND (at least one cardinal neighbor has (an Initial gray level not white AND PUM = 1) OR (at least one cardinal neighbor is selected by the AM), apply the T transition.
Otherwise use the empty (GL) W -> W transition.
End It may be desirable to use the algorithm in conjunction with a regional display mode of the controller. A preferred regional update area for an overlaid item is the area of the item plus one pixel all around its periphery; in this one-pixel border area, the special transition for edge ghosting reduction will be applied when the overlaid item is removed. One controller solution involves the following sequence of actions based on a new controller functionality: creating a full screen image combining the initial image with the addition of the item→performing full screen image processing using that image and the previous initial image based on waveform algorithm→make the decision to perform a regional update using the processed new image for the area and location of the item plus one pixel all around.

From the foregoing, it will be seen that the update buffer controllers and methods of the present invention provide a pathway to use the edge and areal ghosting artifact reducing waveform techniques described in the aforementioned US 2013/0194250 on controllers that implement a "partial update" mode. The present invention requires only a small modification of the definition of the waveform states and a modification of the algorithm, without any changes to controller functionality.

Part B: BPPTOPWWTDS Invention

As already mentioned, the BPPTOPWWTDS aspect of the present invention provides a balanced pulse pair/top-off pulse white/white transition drive scheme in which pixels undergoing white-to-white transitions, identified as likely to give rise to edge artifacts, and in a spatio-temporal configuration such that the drive scheme will be efficacious in erasing or reducing the edge artifact, are driven using a waveform which comprises at least one balanced pulse pair and at least one top-off pulse.

Figure 4:
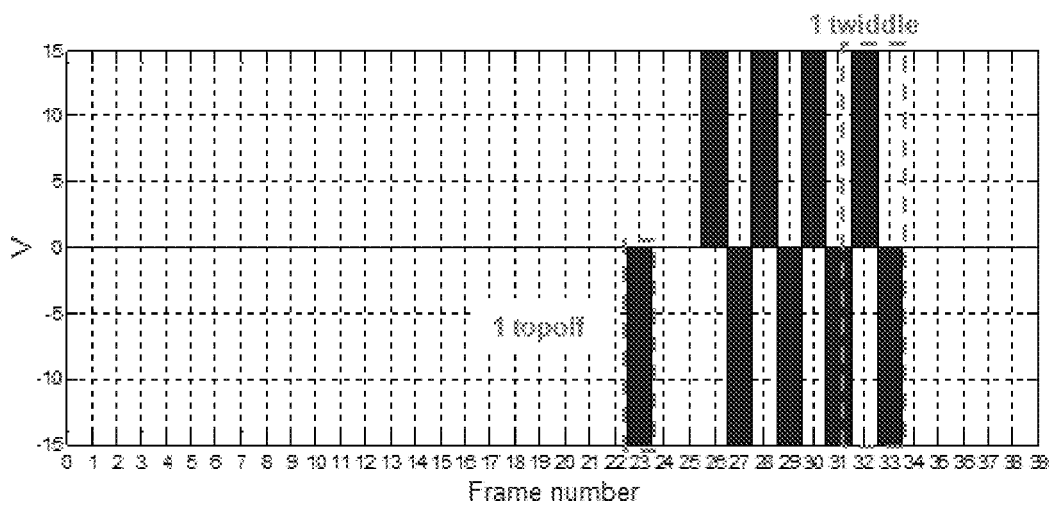
FIG. 4 is a voltage against time curve for a BPPTOPWWTDS waveform for white-to-white transitions.

A preferred white-to-white waveform for a BPP-TOPWWTDS of the present invention is illustrated in FIG. 4 of the accompanying drawings. As may be seen from FIG. 4, the waveform comprises an initial top-off pulse in the form of a single negative (white-going) frame, followed by two frame of zero voltage, and four successive balanced pulse pairs, each of which comprises a positive (black-going) frame followed immediately by a negative (white-going) one.

Figure 2:
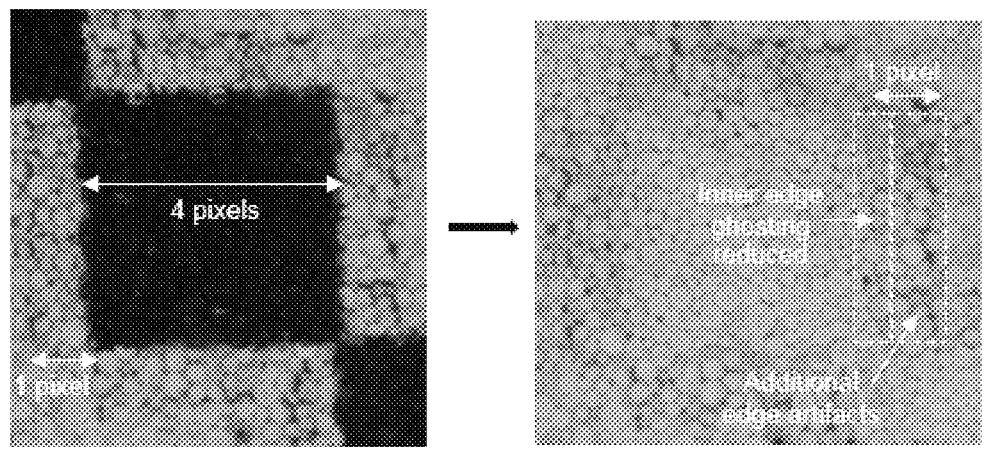
FIG. 2 is a photomicrograph illustrating edge artifacts observed after driving a block of pixels to black, followed by driving the same block of pixels to white, with use of a BPPWWTDS on the neighboring pixels.
Figure 3:
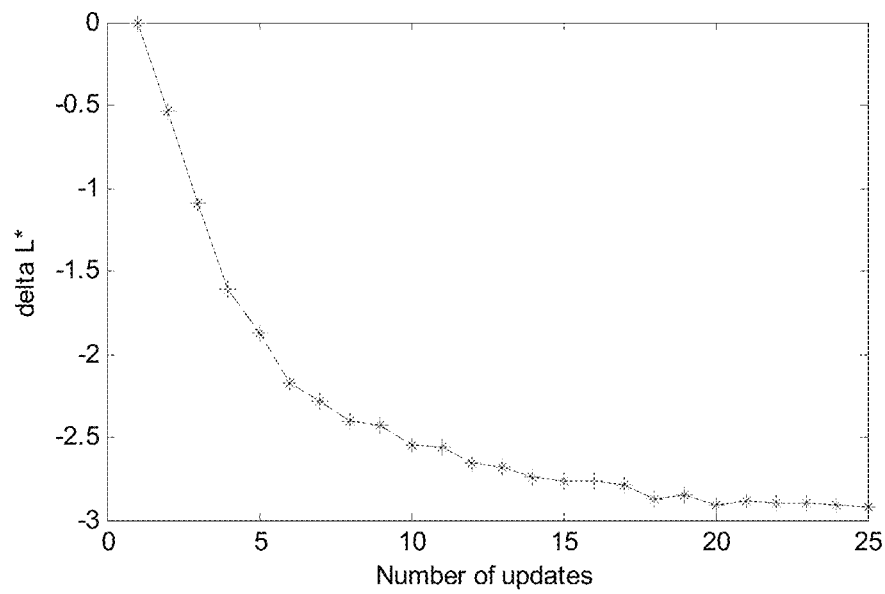
FIG. 3 illustrates white state lightness as function of the number of updates using a prior art BPPWWTDS.
Figure 5:
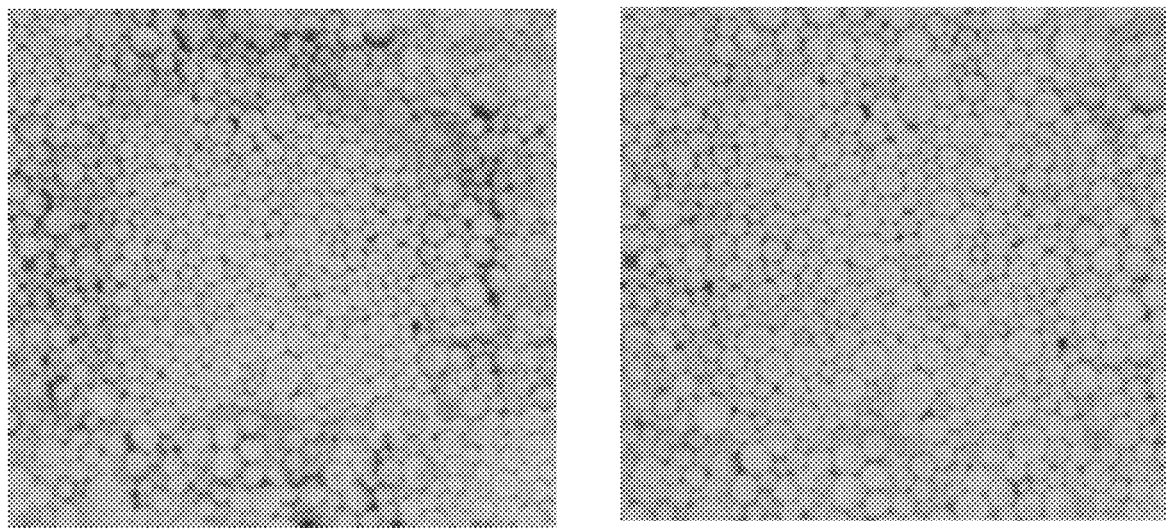
FIG. 5 is a photomicrograph similar to that of FIG. 2 but using a BPPTOPWWTDS of the present invention.
Figure 6:
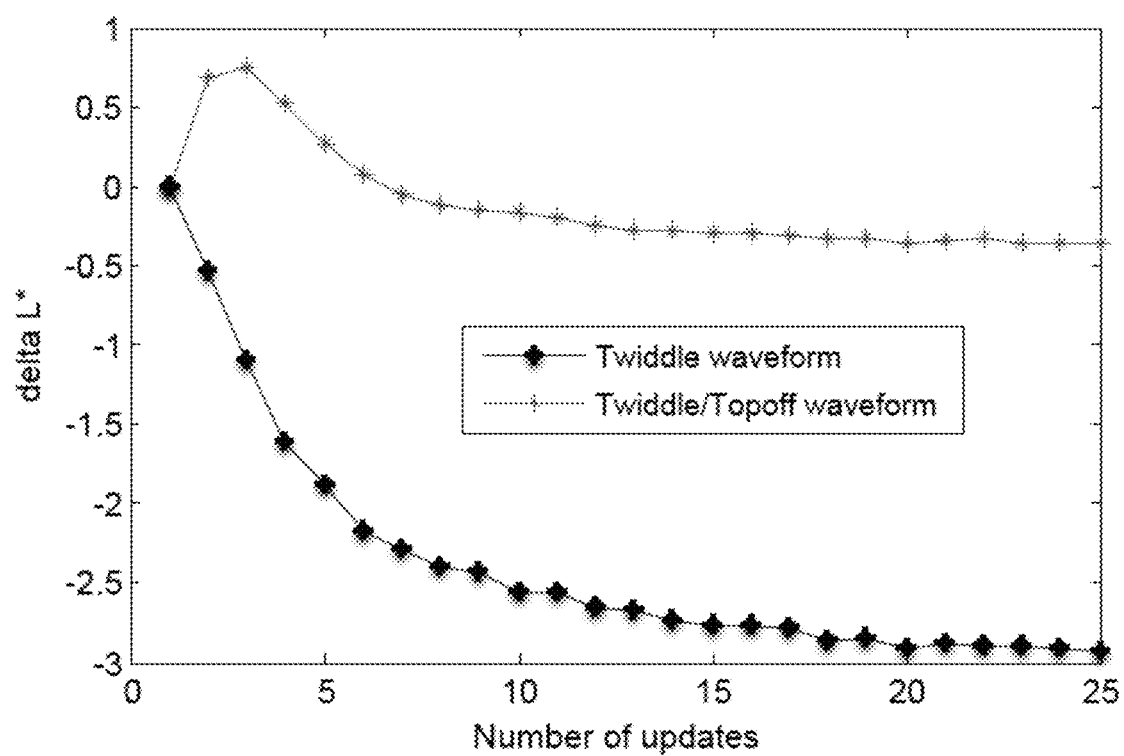
FIG. 6 is a graph similar to that of FIG. 3 but showing the results obtained using both a prior art BPPWWTDS and a BPPTOPWWTDS of the present invention.

The use of a BPPTOPWWTDS of the present invention has been shown to be very effective in significantly reducing all edge artifacts, as illustrated in FIG. 5, which should be compared with the similar micrograph shown in FIG. 2; it will be seen that essentially no edge artifacts are present on the right side of FIG. 5, in contrast to the very prominent edge artifacts visible on the right side of FIG. 2. As a result, the performance of non-flashy drive schemes aimed at maintaining the background white state lightness level can be significantly improved with observed decrease in white state lightness level of less than 0.5 L* using a BPP-TOPWWTDS of the present invention versus over 3 L* using a prior art BPPWWTDS after 24 updates at 45° C. as shown in FIG. 6.

Figure 7:
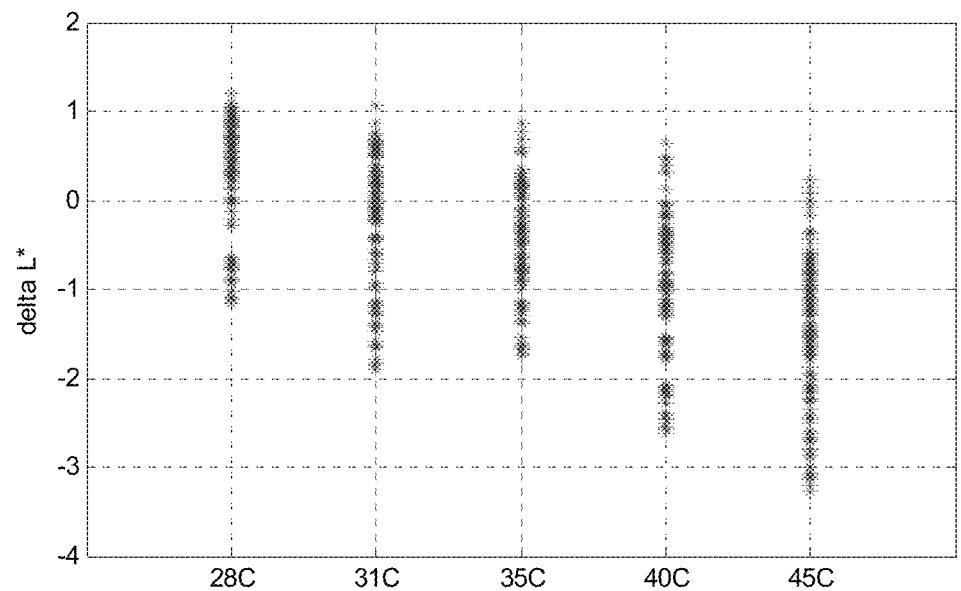
FIG. 7 is a graph showing the white state lightness variation obtained after 24 updates from an initial white state lightness level as a function of the number of updates using various BPPTOPWWTDS of the present invention.

Preferred embodiments of a BPPTOPWWTDS of the present invention, using only a single top-off pulse, but varying the number of balanced pulse pairs and the location of the top-off pulse relative to the balanced pulse pairs, have been observed to provide a wide range of possible waveform solutions for operating at from 28° C. to 45° C., as illustrated in FIG. 7. In this case, acceptable solutions correspond to those resulting in zero delta L* after 24 updates in special low flash mode using the BPPTOPWWTDS. The most significant tuning elements are the location of the top-off pulse relative to the BPP's and the number of BPP's, with a small degree of tunability provided by the location of the BPP's. Locating the top-off pulse closer to the BPP's results in more positive delta L* solutions, with the optimal location being the frame right after the BPPs. For a given BPP-TOPWWTDS white-to-white waveform, it has been observed that decreasing the temperature results in more positive delta L*. Although a potential problem could be that the BPPTOPWWTDS could create solutions with too positive a delta L* (meaning that the display becomes whiter and whiter in an uncontrolled manner), it has been possible to avoid this problem by simply increasing the number of BPP's in the white-to-white waveform which results in a less positive delta L*. FIG. 7 shows that the BPP-TOPWWTDS of the present invention can provide good results over the temperature range of 28° C. to 45° C., while still allowing enough tunability to account for module variability experienced in commercial mass production of electrophoretic displays.

Figure 8:
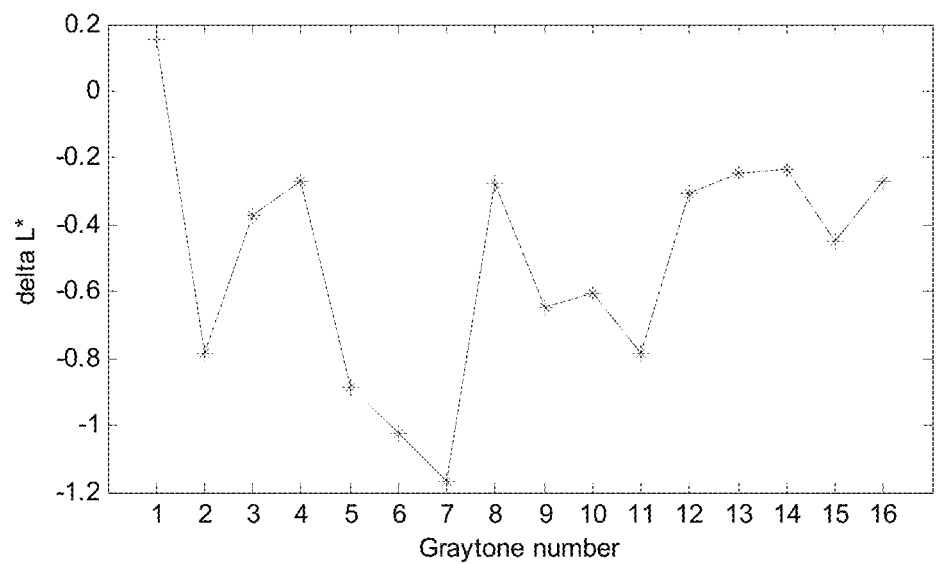
FIG. 8 is a graph showing the gray levels obtained after more than 50,000 updates using a BPPTOPWWTDS of the present invention.

The presence of the top-off pulse in the BPPTOPWWTDS of the present invention renders the drive scheme somewhat DC imbalanced, and (as discussed in several of the aforementioned MEDEOD applications), DC imbalanced drive schemes are known to potentially cause significant display reliability issues and significant changes in drive scheme performance. However, as already noted significant reduction in edge artifacts in electrophoretic displays can be achieved using just one top-off pulse in the BPP-TOPWWTDS white-to-white waveform, resulting (typically) in a mild DC imbalance of just one white-going frame. Usage reliability experiments using a special low flash mode that make use of such a BPPTOPWWTDS have been conducted, and the results are shown in FIG. 8. As shown in that Figure, after over 50,000 updates (estimated to correspond to about one year of e-reader usage), only slight shifts in gray levels of between +0.2 L* and −1.2 L* were visible, and these slight shifts could be due to other known factors such as so-called display fatigue. These results after over 50,000 updates also show variations in white state and dark state 30 second transient drifts of less than 0.5 L*. These results show that BPPTOPWWTDS with one top-off pulse used in special low flash modes aimed at reducing edge artifacts and maintaining background white state do not cause reliability issues. This is due to the drive scheme being only slightly DC imbalanced and being used on the display in such a way that the potential effects of DC imbalance are contained.

From the foregoing, it will be seen that the BPP-TOPWWTDS of the present invention can significantly extend the temperature range over which electrophoretic displays can operate without producing image defects, be enabling such displays to operate for a large number of updates at the temperature range of about 30 to 45° C. without being subject to the type of image defects to which prior art displays are subject, thus rendering displays using the drive scheme more attractive to users.

Part C: Overlay Invention

As already mentioned, the overlay aspect of the present invention provides a method for overlaying an item (an icon, menu, etc.) over existing text or image content followed by a removal of the item, and differs from standard partial updates drive schemes in that only the pixels in the region of the item perform transitions (including self transitions) in order to avoid text thinning/fading for text that overlaps with the item and to avoid seeing the text outside that area flashing on to itself. In a simple form of the present invention a regional update is performed in the area of the overlaid item. Preferred variants of the overlay method can allow for transparent areas within the overlaid item.

In the preferred variant of the overlay method discussed above with reference to FIGS. 11A-11C and 12A-12C, the algorithm used can be summarized as follows:

For a given pixel with a given gray level in the current image:
   IF Mask determines that this pixel must perform a non-empty self transition to update to the next image, set pixel state on the next image to gray level state with non-empty self transition;
   ELSE set pixel state on next image to gray level state with empty self transition.

In driving modes that involve 16 gray levels plus special states required for special algorithms (for example, the "balanced pulse pair white/white transition drive scheme" and the "white/white top-off pulse drive scheme" described in the aforementioned US 2013/0194250), the five-bit drive scheme solution described above cannot be applied to all 16 gray levels because a five-bit drive scheme does not provide enough additional states. The five-bit drive scheme solution may be applied only to a restricted number of gray levels. For example, if the algorithm requires two special states then two gray levels must be dropped from the algorithm, so that, for example, the algorithm might be applied to gray levels 1→14 only. Such a variant of the overlay method could still be effective is reducing text thinning/fading since most of the gray levels in text are with gray levels 1→14. However, in some other scenarios, restricting the process to certain gray levels might not work well enough.

In such cases, where selective partial updates are needed for all existing gray levels, a "controller-spoofing" method can be used in conjunction with the algorithm described above. In such a controller-spoofing method, all the pixels requiring empty self transitions as determined by a mask are set to one same special empty state with empty self transition (for example state 2). That processed image is then sent to the controller using a special mode that has a fully empty waveform in order to set the states inside the controller as desired by the algorithm without actually updating the pixels of the display. The second image is then displayed with the use of the special empty state 2. Once it is desired to not do empty self transitions for pixels currently in state 2, or to do other transitions to other gray levels, another processed image needs to be sent to the controller with an empty waveform in order to reset all the pixels currently in state 2 to their original states. Therefore, this solution could result in latency issues as it requires sending to the controller two additional processed images with empty waveforms.

In another variant of the overlay method, a device controller function is provided which accepts the mask described above and places pixels on the update buffer according to this mask instead of the partial update logic that it would normally perform. One shortcoming of this approach is the need for a mask of the opaque part of the overlaid item. This, however, is not an unrealistic requirement since the rendering engine for the graphic user interface of a electro-optic display must have such a mask available to it, but the use of such a mask does require a greater amount of data handling and increases system complexity.

An alternative to this mask-based approach is to determine the list of pixels with self-transitions that should be refreshed based on the activity of neighboring pixels, i.e., the mask is inferred from the image data, and subsequent steps implement the approach as if it were mask-based. For example, one algorithm may be defined as:

For a given pixel with a given gray level in the current image:
   IF it is determined from the next image that this pixel is performing a self-transition to update to the next image AND IF at least one of its cardinal neighbors (i.e., neighbors sharing a common edge) is not performing a self-transition;
   THEN set pixel state on the next image to gray level state with non-empty self-transition
   ELSE set pixel state on next image to gray level state with empty self-transition.

Such an algorithm should be applied in a non-recursive manner in order to avoid a propagation effect, i.e., setting a pixel to perform a non-empty self transition as determined from this algorithm would not trigger setting its cardinal neighbors with self transitions to perform non-empty self transitions. For example, if a feature contains several columns of pixels that are performing self transitions in an image sequence while an icon is being overlaid and dismissed multiple times on top of that feature, this algorithm would trigger the columns of pixels at the edge of the feature to perform non-empty self transitions. Such an approach should result in reducing most of the visible text thinning/fading as blooming typically affects only the immediate cardinal neighbors.

The algorithm described above is general in the sense that it is applied to all gray levels, including white, and thus in a partial update mode in which the background white state is not intended to flash, some white pixels in the background may perform white→white transitions depending on the activity of their neighboring pixels. For example, if a long black line is written on the display, all the neighboring pixels around the black line would perform white→white transitions, resulting in lines and geometric features with uniform thicknesses, thus avoiding the issue of non-uniform line thickness which has plagued prior art partial update drive schemes. However, the pixels performing white→white transitions may induce the formation of edge artifacts around them. Therefore, desirably such a drive method would be applied in conjunction with a display mode designed to reduce edge artifacts in order to avoid the formation of those artifacts. Another variation of this method would except certain gray levels; for example, the method could be applied to all gray levels except white, thus avoiding the aforementioned edge artifact problem.

In the method just above, as in the mask-based method previous described, a five-bit drive scheme may be used if only 16 gray levels are required. If additional special states exist in the drive scheme, the method may be applied to most but not all of the gray levels, for example gray levels 1→14 of 16. As with the mask-based approach, this drive scheme would solve most of the text thinning/fading issues. If it is necessary to apply the method to all existing states, then the implementation of this method would require resetting the states inside the controller as described previously with the use of two additional empty display updates.

From the foregoing, it will be seen that the method of the present invention can reduce or eliminate problems such as text thinning and fading encountered in prior art partial update drive schemes, while maintaining the low-flash characteristics of a partial update drive scheme for electro-optic displays. The present method is compatible with novel drive scheme algorithms that result in low-flash, high image quality display performance, thus rendering displays using the drive scheme very attractive to users.

Part D: Drift Compensation Invention

As already mentioned, the drift compensation aspect of the invention provides a method of driving a bistable electro-optic display having a plurality of pixels each capable of displaying two extreme optical states, in which, after the display has been left undriven for a period of time, successive refresh pulses are applied to proportions of the background pixels to reverse at least partially the effects of drift.

The drift compensation method may be regarded as a combination of a specially designed waveform with an algorithm and (desirably) a timer to actively compensate for the background white state (or other) drift as seen in some electro-optic and especially electrophoretic displays. The special waveform is applied to selected pixels in the background white state when a triggering event occurs that is typically based on a timer in order to drive the white state reflectance up slightly in a controlled manner.

Figure 15:
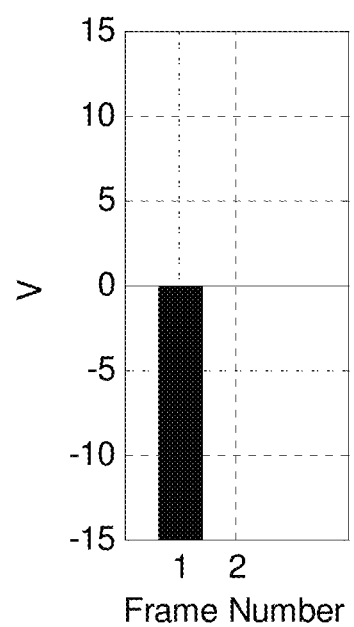
FIG. 15 shows a waveform suitable for use in the drift compensation method of the present invention.

One example of a waveform useful in the drift compensation method is shown in FIG. 15. This waveform may be as short as 2 frames (about 24 milliseconds with a typical 85 Hz frame rate) and may contain a single white-going top-off pulse (frame 1). The purpose of this waveform is to slightly increase the background white state in a way that is essentially invisible to the user and therefore non-intrusive. The drive voltage of the top-off pulse may be modulated (for example −10V instead of the −15V used in other transitions) in order to control the amount of white state increase.

Figure 16A:
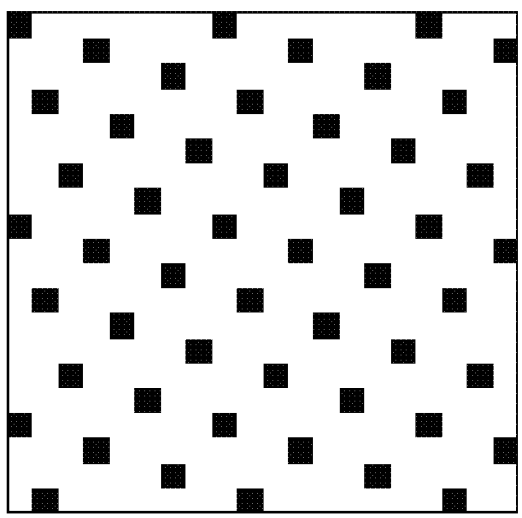
FIGS. 16A and 16B are pixels maps showing areas of background pixels to which one step of the drift compensation method is to be applied, with FIG. 16A showing application of the step to 12.5 percent, and FIG. 16B showing app of the step to 100 percent, of the background pixels in the illustrated area.
Figure 16B:
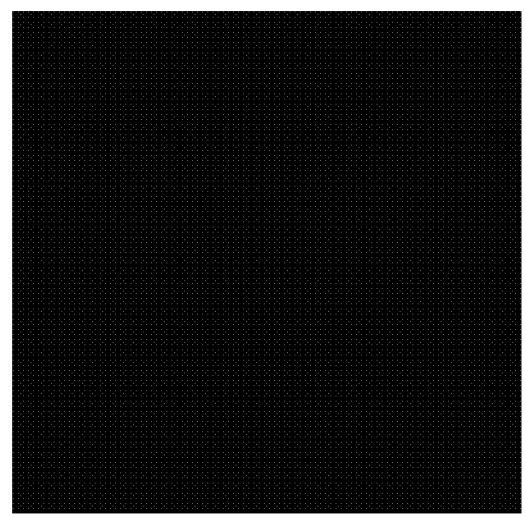

In the drift compensation method of this invention the waveform of FIG. 15 or a similar waveform is applied to selected pixels in the background white state, thus allowing a control white state increase from the update, as illustrated in FIGS. 16A and 16B. By making use of a designed pixel map matrix (PMM) combined with an algorithm, the percentage of the pixels receiving a top-off pulse at each update is controlled. The algorithm used may be a simplified version of the algorithm described in the aforementioned US 2013/0194250. The special transition shown in FIG. 15 would correspond to the F W→W transition discussed in this published application.

Drift compensation is applied by requesting a special update to the image currently displayed on the display. The special update calls a separate mode storing a waveform that is empty for all transitions, except for the special transition shown in FIG. 15. The waveform algorithm will select the pixels that will receive the top-off pulse using the waveform algorithm described below. PMM_VS, PMM_HS, PMM_Period are the vertical size, horizontal size, and period of the pixel map matrix. An update counter ensures that all the pixels will uniformly receive the same amount of top-off pulses over time. A typical algorithm is as follows:

---

Waveform algorithm for Active Drift Compensation with Timer

Inputs: Current (current image pixels), Next (next image pixels equal to current image pixels), PMM (pixel map matrix)
Set Active Mask (i, j) = TRUE if PMM(i mod PMM_VS, j mod PMM_HS) == Update Counter mod PMM_Period
For all pixels (i, j) in any order:
  If the pixel graytone transition is not W -> W, apply the standard transition.
  Else, if the pixel is selected by Active Mask (i, j), apply the F W -> W transition.
  Otherwise use the standard transition.
End

---

The drift compensation method very desirable incorporates the use of a timer. The special waveform used results in an increase in the background white state lightness. Therefore, if this update was tied to user-requested updates, there would be large variations in white state increase depending on how quickly updates were being requested, i.e., if this special update were applied every time a user requested an update, the white state increase would become unacceptably high if a user turned pages very quickly (such as every one second), as opposed to a user turning pages more slowly (such as every thirty seconds). This would result in the drift compensation method being very sensitive to dwell times between updates and in some cases unacceptably high ghosting would occur due to the background white state being increased too much. The use of a timer decouples drift compensation from user-requested updates. By applying the special update independently of user-requested updates, the drift compensation is more controlled and less sensitive to dwell times.

Figure 17:
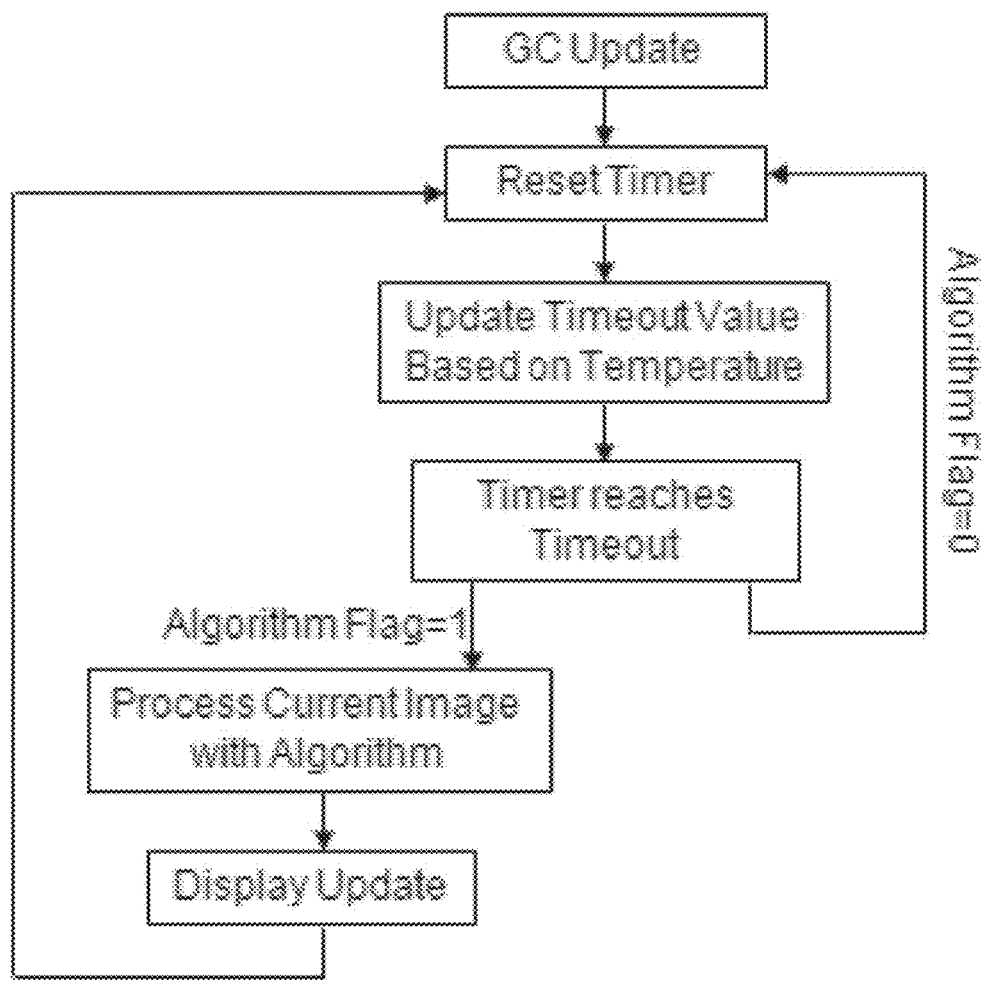
FIG. 17 is a flow diagram showing the implementation of a preferred drift compensation method of the present invention.

A timer may be used in the drift compensation method in several ways. A timeout value or timer period may function as an algorithm parameter; each time the timer reaches the timeout value or a multiple of the timer period, it triggers an event that requests the special update described above and resets the timer in the case of the timeout value. The timer may be reset when a full screen refresh (a global complete update) is requested. The timeout value or timer period may vary with temperature in order to accommodate the variation of drift with temperature. An algorithm flag may be provided to prevent drift compensation being applied at temperatures at which it is not necessary. FIG. 17 is a flow diagram of a drift compensation method implementing the concepts discussed in this paragraph.

Another way of implementing drift compensation is to fix the timer period TIMER_PERIOD (for example, at 60 seconds), and make use of the algorithm PMM and PMM_PERIOD to provide more flexibility as to when the special update is applied. For example, for PMM=[1], PMM_PERIOD=4 and TIMER_PERIOD=60, this is equivalent to applying a top-off pulse to all the background pixels every 4×60 seconds. Other variations may include using the timer information in conjunction with the time since the last user-requested page turn. For example, if the user has not requested page turns for some time, application of top-off pulses may cease after a predetermined maximum time. Alternatively, the top-off pulse could be combined with a user-requested update. By using a timer to keep track of the elapsed time since the last page turn and the elapsed time since the last application of a top-off pulse, one could determine whether to apply a top-off pulse in this update or not. This would remove the constraint of applying this special update in the background, and may be preferable or easier to implement in some cases.

Figure 13:
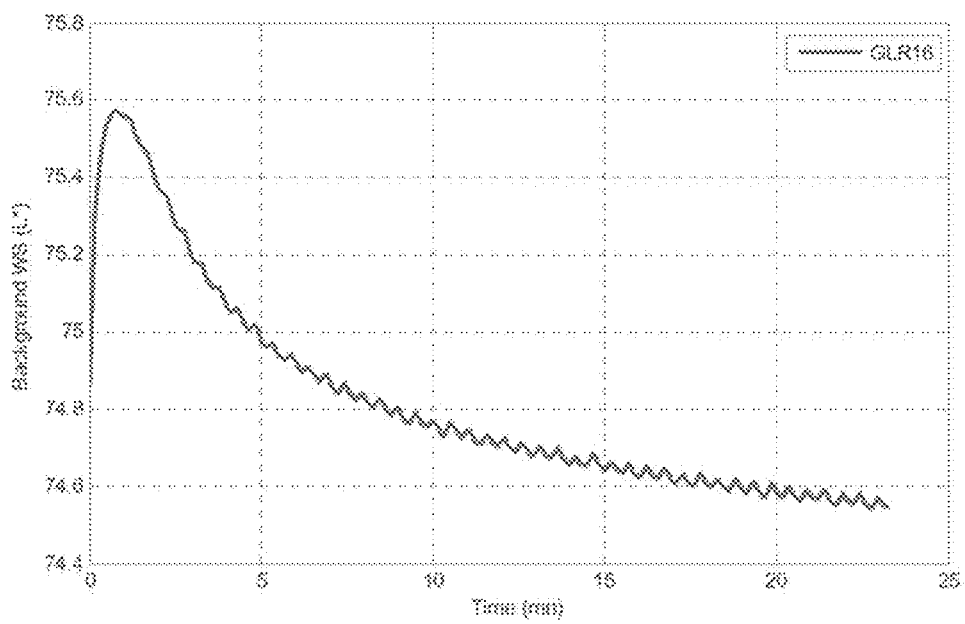
FIG. 13 is a graph of white state reflectance against time for a white pixels and shows typical white state drift in a background pixel, a problem which may be reduced or eliminated by the drift compensation method of the present invention.
Figure 14:
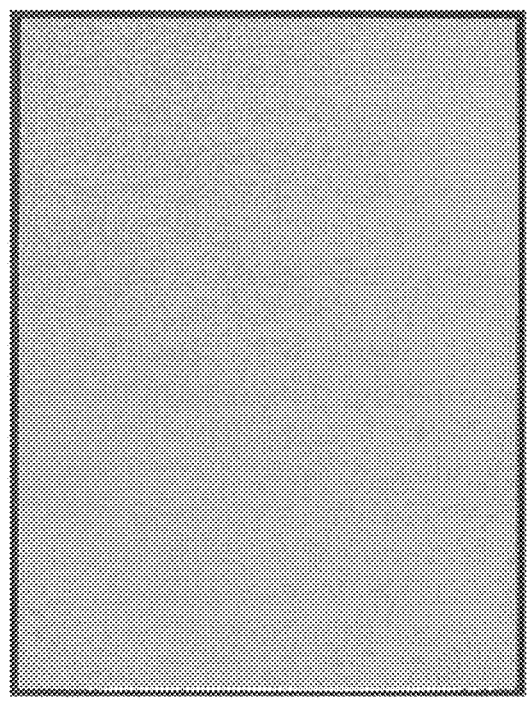
FIG. 14 shows an image on a display affected by ghosting effects caused by white state drift such as that shown in FIG. 13.
Figure 18:
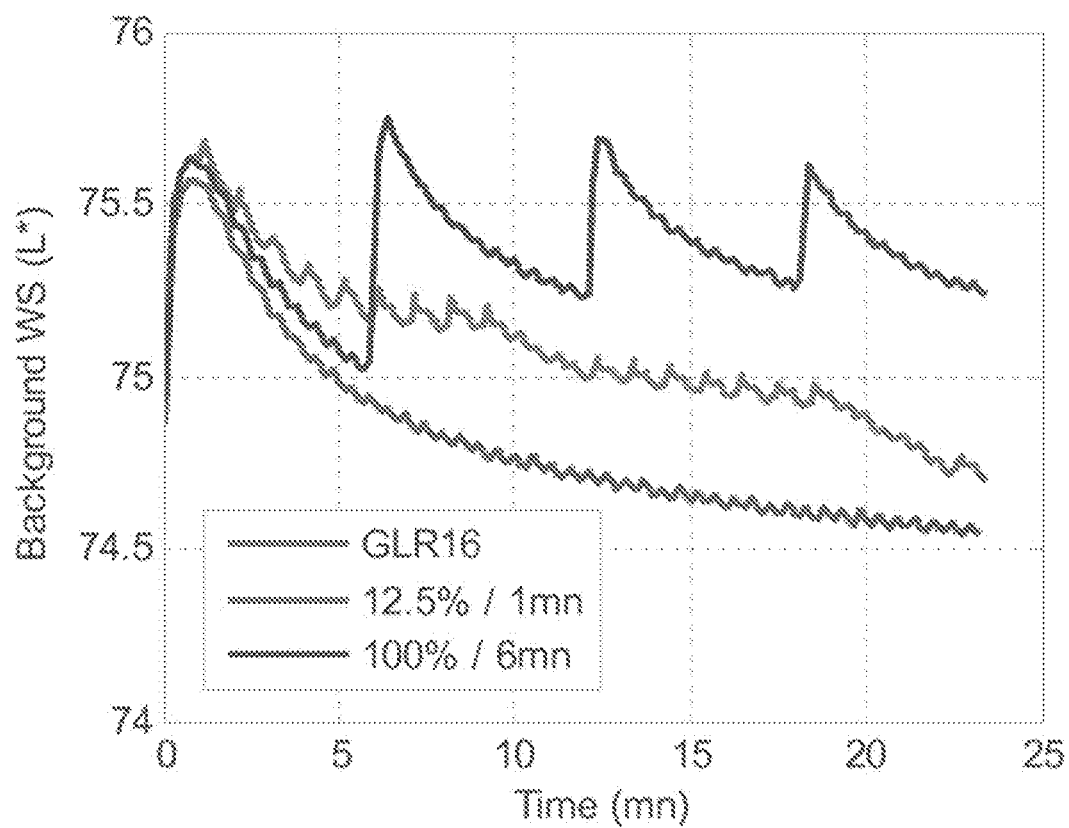
FIG. 18 is a graph similar to that of FIG. 13 but showing, in addition to the curve for an uncorrected pixel, curves for two different methods of drift compensation in accordance with the present invention.
Figures 19A, 19B:
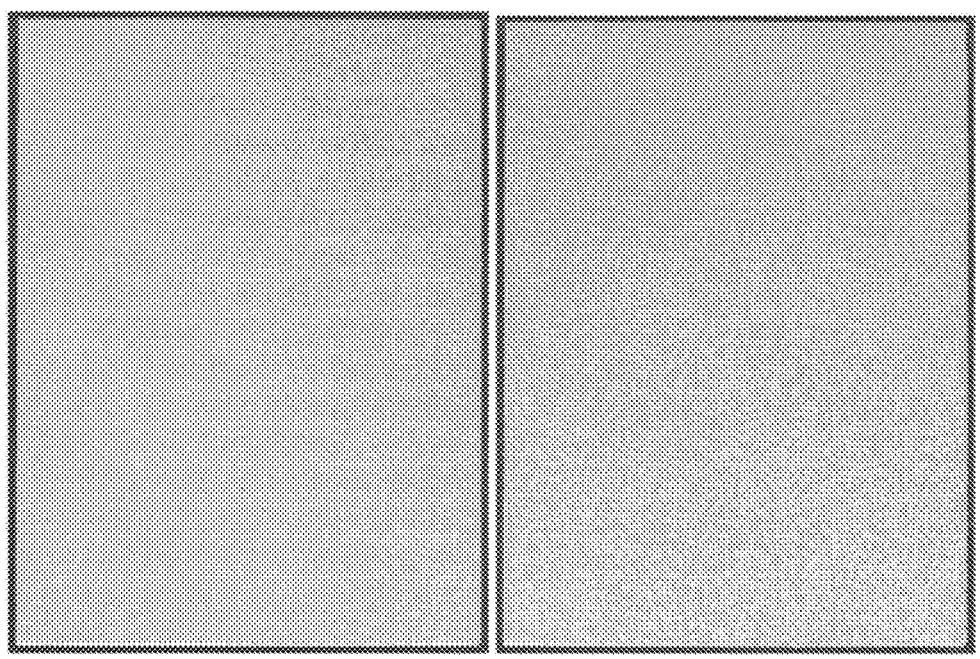
FIGS. 19A and 19B are images similar to that of FIG. 14, with FIG. 19A being an uncorrected image and FIG. 19B being an image corrected by a drift compensation method of the invention.

Examples of the background white state over time with and without drift compensation are shown in FIG. 18. The lowest curve (similar to that shown in FIG. 13) shows the uncorrected background white state over the course of 45 page turns at 30 second intervals. The illustrated drop in white state reflectance would result in substantial text ghosting over time. The center curve shows the result of drift compensation in which 12.5% of the pixels receive the special update every minute, again while 45 page turns occur at 30 second intervals. The upper curve shows a second example of drift compensation in which 100% of the pixels receive the special update every six minutes, using the same sequence of page turns. In both drift compensated cases, the background white state is maintained at a higher level over time which will result in reduced text ghosting and may allow to achieving a higher number of page turns without a full display refresh. In both cases, the special updates have been shown to be invisible to the user. The timer period may be used as another way to control how much white state increase is being applied overall. The improvement in text ghosting is illustrated in FIGS. 19A and 19B, with FIG. 19A showing the uncorrected display at the end of the sequence of page turns and FIG. 19B the display in which 100% of the pixels receive the special update every six minutes.

Figure 20:
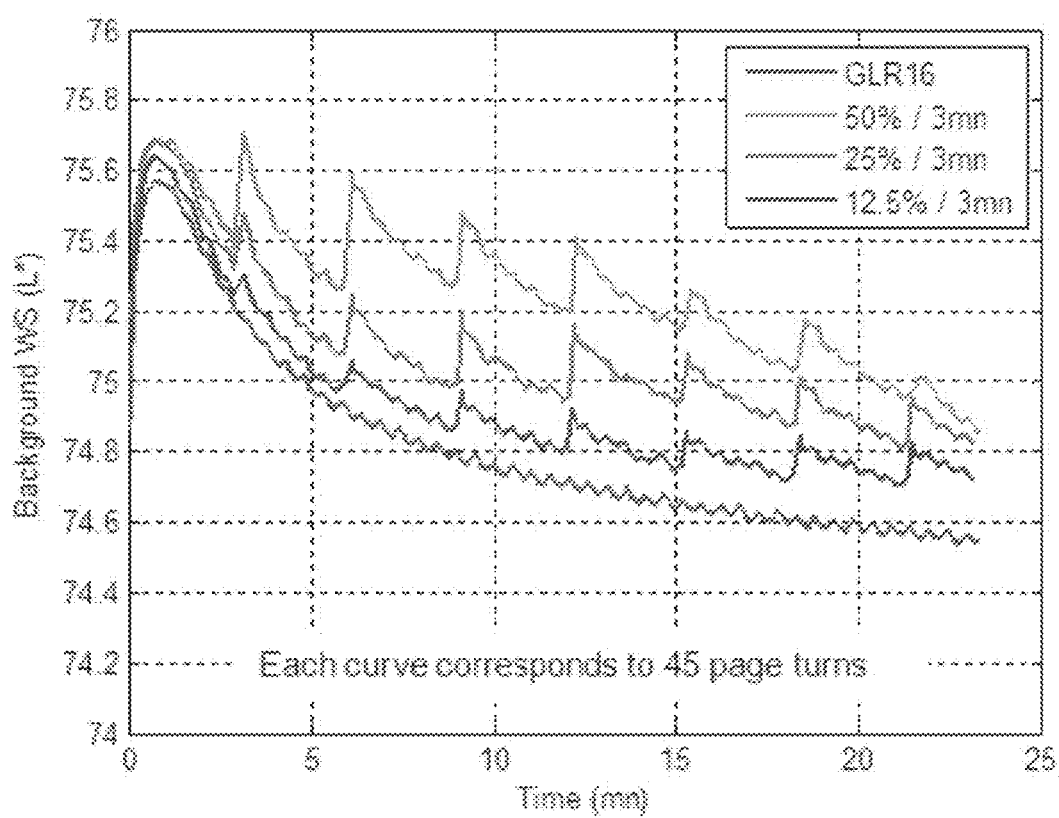
FIG. 20 is a graph similar to that of FIG. 18 and again showing curves for both uncorrected and corrected pixels.

As indicated previously, the white state drift correction may be tuned by a combination of the pixel map matrix, the timer period, and the drive voltage for the top-off pulse. FIG. 20 illustrates the tuning of the background white state drift by varying the density of the pixel map matrix from 12.5% to 50% with a fixed timer of three minutes, using the same sequence of page turns as in FIG. 18.

Figure 21:
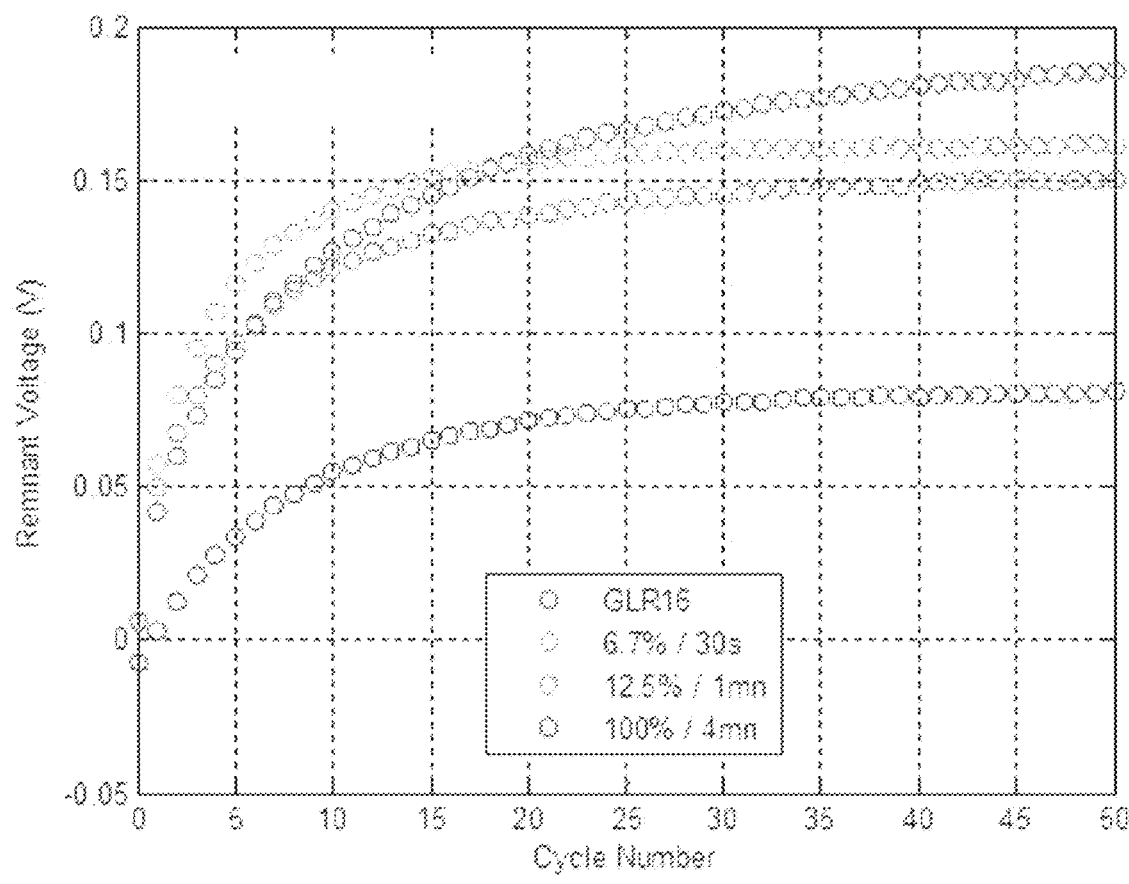
FIG. 21 is a graph of remnant voltage against time (expressed as number of cycles) for both uncorrected pixels and pixels corrected using a drift compensation method of the invention.

As already mentioned, the use of DC imbalanced waveforms is known to have the potential to cause problems in bistable displays; such problems may include shifts in optical states over time that will cause increased ghosting, and in extreme cases may cause the display to show severe optical kickback and even to stop functioning. This is believed to be related to the build up of a remnant voltage or residual charge across the electro-optic layer, and this remnant voltage has a very long decay time. Therefore, it is important to consider the effect of drift compensation on remnant voltage. FIG. 21 shows curves of remnant voltage against time for an uncorrected pixel and three pixels using different drift compensation methods for the same sequence of page turns as in FIG. 20. FIG. 21 shows that in the worst case, drift compensation results in an increase of remnant voltage of about 100 mV above the baseline. Prior knowledge indicates that remnant voltages within a window of about ±250 mV are typical in normal usage. Therefore, FIG. 21 indicates that drift compensation does not appear to have a significant impact on the remnant voltage, and therefore on display reliability with usage.

As already indicated drift compensation can be applied to dark state drift as well as white state drift. A typical waveform for dark state drift compensation could be simply the inverse of that shown in FIG. 15, with a single frame of positive voltage.

From the foregoing it will be seen that the drift compensation method of the present invention provides a means for substantially reducing the effects of drift on a displayed image in a manner which is typically unnoticeable to a user and which does not adversely affect the long term use of the display.

The methods of the present invention may be "tuned" to produce accurate gray levels using any of the techniques described in the aforementioned MEDEOD applications. Thus, for example, the waveform used may include drive pulses having a polarity opposite to that of the waveform as a whole. For example, when a pixel is driven from white to a light gray level, the waveform will typically have an overall black-going polarity. However, to ensure accurate control of the final light gray level, it may be desirable to include at least one white-going pulse in the waveform. Furthermore, for similar reasons, as discussed in the aforementioned MEDEOD applications, it is often desirable to include at least one balanced pulse pair (a pair of drive pulses of substantially equal absolute impulse value, but of opposite polarity) and/or at least one period of zero voltage in the waveform.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for driving a bistable electro-optic display having a plurality of pixels, the method comprising:
   identifying a pixel undergoing a white-to-white transition and lying adjacent to at least one other pixel undergoing a readily visible transition; and
   applying only to the identified pixel one or more balanced pulse pairs subsequent to at least one top-off pulse, wherein the at least one top-off pulse has a duration of one frame and each balanced pulse pair comprises a pair of drive pulses of opposing polarities such that the net impulse of the balanced pulse pair is substantially zero, and the combination of one or more balanced pulse pairs and at least one top-off pulse is applied only when the display is above a predetermined temperature.

2. A method according to claim 1 where only one top-off pulse is applied to the pixel.

3. A display controller or electro-optic display arranged to carry out the method of claim 1.

* * * * *